US012173958B2

(12) United States Patent
Lanzl

(10) Patent No.: US 12,173,958 B2
(45) Date of Patent: Dec. 24, 2024

(54) REFRIGERATING UNIT WITH A HEATING ARRANGEMENT

(71) Applicant: REHAU-BEHR A/S, Hadsten (DK)

(72) Inventor: Thomas Lanzl, Regensburg (DE)

(73) Assignee: REHAU-BEHR A/S, Hadsten (DK)

( * ) Notice: Subject to any disclaimer, the term of this patent is extended or adjusted under 35 U.S.C. 154(b) by 84 days.

(21) Appl. No.: 17/798,663

(22) PCT Filed: Feb. 11, 2021

(86) PCT No.: PCT/EP2021/053341
§ 371 (c)(1),
(2) Date: Aug. 10, 2022

(87) PCT Pub. No.: WO2021/160743
PCT Pub. Date: Aug. 19, 2021

(65) Prior Publication Data
US 2023/0086468 A1 Mar. 23, 2023

(30) Foreign Application Priority Data
Feb. 14, 2020 (DK) .................................. 202070084

(51) Int. Cl.
*F25D 23/08* (2006.01)
*A47F 3/04* (2006.01)
(Continued)

(52) U.S. Cl.
CPC .......... *F25D 23/087* (2013.01); *A47F 3/0434* (2013.01); *E05C 19/161* (2013.01);
(Continued)

(58) Field of Classification Search
CPC ........ F25D 23/087; F25D 21/04; F25D 21/08; F25D 23/02; A47F 3/0434; A47F 3/04;
(Continued)

(56) References Cited

U.S. PATENT DOCUMENTS 3,055,193 A * 9/1962 Smith .................. F25D 23/087 62/331
4,004,370 A 1/1977 Heaney
(Continued)

FOREIGN PATENT DOCUMENTS

JP H02166382 A * 6/1990
JP H03233282 A * 10/1991
(Continued)

OTHER PUBLICATIONS

International Search Report dated May 10, 2021 (4 pages) from PCT Priority Application PCT/EP2021/053341.
(Continued)

*Primary Examiner* — Hanh V Tran
(74) *Attorney, Agent, or Firm* — Crowell & Moring LLP; John C. Freeman

(57) ABSTRACT

A refrigerating unit including a compartment, a glass door, and a heating arrangement installed in a base profile of the compartment. The refrigerating unit including an elongated gasket profile having a proximal part and a distal part, wherein the proximal part includes a flexible element configured to allow the distal part to be displaced towards the base profile upon closing the glass door. The distal part includes a hollow part with a first side of the hollow part connected to the proximal part and a second side of the hollow part directed towards the glass door. The heating arrangement further includes a heat-conducting material enclosed by the hollow part and arranged with an outer side surface of the heat-conducting material abutting the second side of the hollow part, and a heating element enclosed by the hollow part and arranged for conductive heating of the heat-conducting conductive material.

14 Claims, 6 Drawing Sheets

(51) Int. Cl.

| | |
|---|---|
| ***E05C 19/16*** | (2006.01) |
| ***F25D 21/04*** | (2006.01) |
| ***F25D 21/08*** | (2006.01) |
| ***F25D 23/02*** | (2006.01) |
| ***H05B 3/06*** | (2006.01) |
| ***H05B 3/56*** | (2006.01) |
| ***H05B 3/84*** | (2006.01) |

(52) U.S. Cl.
CPC ............. *F25D 21/04* (2013.01); *F25D 21/08* (2013.01); *F25D 23/02* (2013.01); *H05B 3/06* (2013.01); *H05B 3/56* (2013.01); *H05B 3/84* (2013.01)

(58) Field of Classification Search
CPC ........... E05C 19/161; H05B 3/06; H05B 3/56; H05B 3/84
See application file for complete search history.

(56) References Cited

U.S. PATENT DOCUMENTS

| | | | | | |
|---|---|---|---|---|---|
| 4,891,912 | A * | 1/1990 | Bockwinkel | F25D 23/082 | 49/478.1 |
| 5,024,023 | A * | 6/1991 | Kostos | E06B 3/5427 | 52/786.13 |
| 5,129,184 | A | 7/1992 | Fish | | |
| 5,255,473 | A * | 10/1993 | Kaspar | A47F 3/043 | 49/504 |
| 5,778,689 | A | 7/1998 | Beatenbough | | |
| 6,367,223 | B1 | 4/2002 | Richardson et al. | | |
| 10,156,090 | B2 * | 12/2018 | Goppion | A47F 3/005 | |
| 10,365,029 | B2 * | 7/2019 | Grenier | E06B 1/325 | |
| 2001/0003408 | A1 * | 6/2001 | Otto | F25D 27/00 | 312/401 |
| 2002/0073645 | A1 | 6/2002 | Richardson et al. | | |
| 2002/0078654 | A1 | 6/2002 | Richardson et al. | | |
| 2009/0039751 | A1 | 2/2009 | Keller et al. | | |
| 2009/0314028 | A1 | 12/2009 | Laible | | |
| 2018/0070744 | A1 | 3/2018 | Thoutam et al. | | |
| 2018/0146798 | A1 | 5/2018 | Artwohl et al. | | |
| 2019/0072313 | A1 * | 3/2019 | Grenier | F25D 23/02 | |
| 2020/0041196 | A1 | 2/2020 | Heckler et al. | | |

FOREIGN PATENT DOCUMENTS

| | | | | | |
|---|---|---|---|---|---|
| JP | H0534047 | A | | 2/1993 | |
| JP | H06265262 | A | | 9/1994 | |
| JP | 2007-178032 | A | | 7/2007 | |
| JP | 2007-205588 | A | | 8/2007 | |
| JP | 2014066386 | A | * | 4/2014 | |
| JP | 2017-020711 | A | | 1/2017 | |
| KR | 20100036616 | A | * | 4/2010 | |
| WO | WO 2017/006813 | A1 | | 1/2017 | |
| WO | WO-2018080482 | A1 | * | 5/2018 | A47F 3/001 |
| WO | WO 2018/164590 | A1 | | 9/2018 | |

OTHER PUBLICATIONS

Written Opinion of the International Searching Authority dated May 10, 2021 (6 pages) from PCT Priority Application PCT/EP2021/053341.

* cited by examiner

REFRIGERATING UNIT WITH A HEATING ARRANGEMENT

This application is a national application based on Patent Cooperation Treaty Patent Application No. PCT/EP2021/053341, filed on Feb. 11, 2021, the entire contents of which are incorporated herein by reference.

This application claims under 35 U.S.C. § 119 (a) the benefit of the filing date of Danish Patent Application No. PA202070084, filed on Feb. 14, 2020, the entire contents of which are incorporated herein by reference.

BACKGROUND OF THE INVENTION

Field of the Invention

The present invention relates to a refrigerating or chiller unit including a heating arrangement for heating a glass door of the refrigerating or chiller unit.

Description of Related Art

Refrigerating units are commonly found in grocery stores, supermarkets or the like and used for storing and displaying cooled goods, such as food. In order for a good and fast shopping experience, the customer may advantageously observe the goods through transparent covers or doors, such as a glass door, of the refrigerating unit, while the refrigerating unit is closed. Thus, it is desired that a high degree of visibility through the doors or covers is maintained.

SUMMARY OF THE INVENTION

Especially for glass doors of a refrigerating unit, the temperature difference, which exist between the interior of the refrigerating unit and the exterior of the refrigerating unit can cause condensation of water vapour on the glass surfaces, which in turn decreases the visibility through the glass door. It is therefore an object of the present invention to provide a refrigerating unit with a heating arrangement, which significantly decreases the occurrence of condensation of water vapour into liquid water on the glass door and thereby maintains a high degree of visibility through the door.

The first aspect of the invention relates to a refrigerating unit including a heating arrangement for modulating the temperature of an outer surface of a glass door of the refrigerating unit, wherein the refrigerating unit includes a compartment provided with an opening enclosed by side profiles and the refrigerating unit further includes said glass door for allowing access through the opening, wherein the heating arrangement is configured to be installed in a base profile of the compartment, and includes:

an elongated gasket profile comprising a proximal part and a distal part, wherein the proximal part is arranged from the base profile to the distal part of the elongated gasket profile, and wherein the proximal part includes at least one flexible element configured to allow the distal part to be displaced towards the base profile upon closing the glass door, wherein the distal part includes at least one hollow part with a first side of the hollow part connected to the proximal part and an opposite second side of the hollow part directed towards the glass door, one or more first heat-conducting materials enclosed by the hollow part and arranged with an outer side surface of the first heat conducting material(s) abutting the second side of the hollow part, one or more heating elements enclosed by the hollow part and arranged for conductive heating of the first heat-conductive material(s).

The present invention as disclosed above provides several advantages, e.g., as the flexible element of the gasket profiles is arranged behind the heating elements, i.e. between the compartment and the heating elements, the flexible element is not interfering with the transfer of heat between the heating element and the door. This provides a heating arrangement, where the heating elements can be positioned in the distal part directed towards the door with only the second side of the hollow part separating the heated source (heat conducting material and heating element) and the glass door. The heating arrangement thereby provides for a more optimized conductive heat transfer between the heating element and the door.

Another advantage of the present invention is that the heating arrangement can be positioned in the compartment and not in the door of the refrigerating unit, whereby the risk of causing any damages to the wires etc. of the heating elements during pivoting of the door is effectively reduced. Furthermore, there is no need to provide the door with ducts or cables for the heating arrangement.

One of the purposes of the present heating arrangement is to prevent the formation of dew condensation on the glass door by modulating the temperature of the glass door. In one or more embodiments, when the refrigerating unit is in use, the temperature inside the refrigerating unit is of a lower temperature than the temperature of the air outside of the compartment. E.g., a chiller unit being a refrigerating unit provided in supermarket typically has a temperature in the compartment of about 0-5 degrees Celsius while the temperature of the air inside of the supermarket is about 20-25 degrees Celsius. In one or more embodiments, the refrigerating unit may have a temperature below 0 degrees Celsius, such as between-25 degrees and 0 degrees Celsius while the temperature of the air inside the supermarket is about 20-25 degrees Celsius.

If the temperature of a surface is below the dew point temperature of the air at the surface, the water vapor of the air will form liquid water on the surface. The dew point temperature of the air is the temperature at which the air is saturated with water vapour. Therefore, as the air outside the compartment comes into contact with the glass door of a lower temperature than the dew-point of the air, formation of condensation on the glass door will occur, which in turn significantly reduces the transparency of the glass door making it difficult to observe the inside of the compartment of the refrigerating unit through the glass door.

In one or more embodiments, the heating arrangement is configured to modulate the temperature of the outer glass pane surface, e.g. by raising the temperature, so that the temperature of the outer glass pane surface is changed to a temperature above the dew point temperature of the air. In one or more embodiments, the heating arrangement may provide a temperature of the outer glass surface, which may be at a temperature substantially equal or higher than the temperature of the air surrounding the refrigerating unit.

In one or more embodiments, the glass door includes an inner glass pane surface and an outer glass pane surface provided by either one glass pane or alternatively by two or three glass panes arranged in parallel with a spacing in between. In one or more embodiments, the spacing may provide an insulating cavity between the glass panes, e.g., the cavity may be devoid of air and depressurized or the cavity may be filed with a gaseous medium. The main transfer of heat between an innermost glass pane of the glass door and an outermost glass pane of the glass door may be through conductive heating of spacer element(s) arranged in abutment with the glass panes of the glass door, e.g., a spacer element(s) arranged from the outermost glass pane to the innermost glass pane along the peripheral edges of at least the bottom of the glass panes. During heating of the innermost glass pane by the heating arrangement, the innermost glass pane in turn provides conductive heating of the outermost glass pane via the spacer element(s) connected to the glass panes. The present refrigerating unit may therefore provide selective heating, whereby parts of the glass door are affected more by the heat generated by the heating arrangement than other parts of the glass door.

In one or more embodiments, the distal part is arranged to be in abutment with an inner surface of the glass door, e.g., an inner glass pane surface of the door or a heat-conducting member of the glass door. In one or more embodiments, the distal part includes contact surface arranged opposite the second surface of the hollow part and directed outwards towards the outside of the compartment, e.g., towards the glass door when the door is closed. In one or more embodiments, the contact surface is configured to abut an inner surface of the glass door.

In one or more embodiments, the glass door includes an inner surface of the glass door configured to come into contact with the distal part of the refrigerating unit, when the glass door is closed, and wherein the inner surface of the glass door includes-a contact profile including a second heat-conducting material.

The refrigerating unit may be provided with a second heat-conducting member connected to the glass door so as increase the transfer of conductive heat between the heating arrangement and the outermost glass pane surface of the glass door. In one or more embodiments, the contact profile is made of a plastic material such as polyvinylchloride (PVC). In one or more embodiments, the contact profile may include a first section enclosing a first space provided with the second heat-conducting material. In one or more embodiments, the second heat-conducting material extends from a first boundary of the first space to an opposing second boundary of the first space along a direction extending perpendicular to the outer glass pane surface of the glass door, i.e., along the width of the contact profile. This provides the effect of increasing the transfer of heat by conductive heating from the heating arrangement towards the glass door via the contact profile.

In one or more embodiments, the second heat conducting material and the contact profile may be manufacturing from a co-extrusion process.

In one or more embodiments, heat may be transferred from the distal part of the refrigerating unit, through a part of the contact profile, through the second heat conducting material to the glass door, through an opposing part of the contact profile to a glass pane surface of the glass door.

In one or more embodiments, the second heat conducting material includes an outer surface shape corresponding to an inner surface shape of the first space of the contact profile. The second heat conducting material may be tightly fitted into the first space of the contact profile, such that the outer surface shape of the second heat conducting material is abutting the inner surface shape of the first space of the contact profile.

In one or more embodiments, the contact profile is attached to an inner glass pane surface of the glass door by an adhesive.

In one or more embodiments, the hollow part includes at least one permanent magnetic material and wherein the glass door includes at least one ferromagnetic material, wherein the ferromagnetic material and the permanent magnetic material are arranged in an opposing configuration such that a magnetic interaction between the ferromagnetic material and the permanent magnet aids in closing the glass door.

In one or more embodiments, the contact profile encloses an insulating space for decreasing a conductive transfer of heat between an inner glass pane surface of the glass door and the heating element(s), wherein the insulating space is arranged above the second heat-conducting material.

By the present contact profile having an insulating space, the inner glass pane surface is shielded from the heat generated by the heating element(s). By the present invention, the majority of the heat generated by the heating element(s) is transferred to the outer glass pane surface of the glass door. In one or more embodiments, the height of insulating space is between 0.5-5 cm, measured in a direction perpendicular to the ground floor on which the refrigerating unit is standing along the outer glass pane surface. In one or more embodiments, the thickness of the insulating space, measured perpendicular to the outer glass pane surface, is between 0.1 and 2 cm, such as about 7 mm.

In one or more embodiments, the refrigerating unit includes at least one permanent magnetic material connected to the glass door and wherein the refrigerating unit further includes at least one ferromagnetic material enclosed by the hollow part, wherein the ferromagnetic material and the permanent magnetic material are arranged in an opposing configuration such that a magnetic interaction between the ferromagnetic material and the permanent magnet aids in closing the glass door.

By the present invention, the magnetic materials provides a mutual attraction force when in close vicinity to each other, such that the door may be closed properly and remain closed until a user of the refrigerating unit applied a counteracting force large enough to pull the magnetic materials apart.

In the present disclosure, the permanent magnetic material is a material exhibiting permanent ferromagnetism. In one or more embodiments, the permanent magnetic material may of any commercial type of permanent magnetic material. The permanent magnetic material may be produced by powder metallurgical sintering techniques, from alloys of rare earth metals and/or ferromagnetic metals.

In one or more embodiments, the one or more first heat-conducting materials includes the ferromagnetic material.

In one or more embodiments, the ferromagnetic material may be a ferromagnetic metal strip of elongated shape, and arranged with an outer side surface of the ferromagnetic metal strip in abutment with the second side of the hollow part. The outer side surface of the ferromagnetic strip is preferably arranged directed towards the glass door.

In one or more embodiments, the first heat conducting material(s) may additionally include a non-ferromagnetic material. The non-ferromagnetic material may be optimized for conductive heat transfer and may be arranged between the ferromagnetic material and the heating element(s).

In one or more embodiments, the ferromagnetic material may include one or more of the following elements: iron, iron alloy, cobalt or nickel.

In one or more embodiments, the one or more heating elements is at least partially embedded into the first heat-conducting material(s).

By the present invention, the first heat conductive material is directly heated by the heating element(s) through conductive heating. The heat generated may thereby be more efficiently transferred to the first heat-conducting material. Additionally, the heat may be more evenly distributed. Furthermore, the heat-conducting material(s) provide a protective effect for the heating elements. In one or more embodiment, the one or more heating elements may be embedded in the first heat conducting material(s).

In one or more embodiments, the heating element(s) may include one or more heating wire(s). In one or more embodiments, the heating element(s) may be embedded and surrounded by the first heat conducting material(s) in the transverse plane extending perpendicular to the longitudinal extent of the heating elements.

In one or more embodiments, the one or more second heat-conducting materials include the permanent magnetic material.

By the present invention, heat generated by the heating element(s) may be transferred towards the outer glass pane surface of the glass door via the permanent magnetic material, whereby the second heat-conducting material provides a double function of aiding in closing the door and aiding in transfer of heat. In one or more embodiments, the second heat conducting material is a permanent magnetic material.

In one or more embodiments, the permanent magnetic material is a polymer-bonded magnetic material, such as a polymer-bonded magnetic material including between 70-95 percentage of mass of magnetic material and between 5-30 percentage of mass of polymer material.

In a preferred embodiment, the polymer-bonded magnetic material may include between 90-95 percentage of mass of magnetic material. In one or more embodiments, the polymer bonded magnetic material is a composite material including a polymer matrix and one or more types of magnetic filler particles. By embedding the magnetic filler particles in the polymer matrix, the risk of corrosion of the particles is significantly reduced. Additionally, the polymer bonded magnetic material may include one or more additives.

Compared to conventional permanent magnets, polymer bonded permanent magnetic materials have a greater freedom of design regarding both their geometric shape and magnetizing structure. This enables positioning and shaping the magnet to readily fit to the specific needs and design of the present application.

In one or more embodiments, the polymer bonded magnetic material may be cost-effectively manufactured by an injection molding manufacturing process. The injection molding process allows for an efficient production of high quantities of dimensionally accurate permanent magnets, such that the magnets may be adapted to the present application. Additionally, the permanent magnetic materials may include complex magnetizing structures.

In one or more embodiments, the polymer bonded magnetic material may preferably be manufactured by an extrusions process. Advantageously, the extrusions process allows for fast and low-cost production of profiles. Furthermore, the extrusions process allows for co-extrusion of two or more different materials, e.g. polymer and magnetic materials.

In one or more embodiments, the polymer bonded magnetic material provides a dense material with a large cross-section for thermal conductivity. The polymer-bonded magnet provides a thermal conductivity larger than a pure plastic material and can therefore aid in the transfer of heat between the heat element(s) and the outer glass door surface.

In one or more embodiments, the permanent magnetic material may include a conventional sintered permanent magnetic material. Additionally, the permanent magnetic material may include a polymer bonded magnetic material.

In one or more embodiments, the refrigerating unit includes a metal profile enclosed by the hollow part of the distal part and arranged in abutment with the first heat-conducting material(s) and the heating element(s).

The present metal profile may preferably be arranged to provide an increase in heat transfer between the heat-conducting material(s) and the heating element(s). An occurrence of high temperature hot spots at areas of the heat elements is thereby significantly reduced as the heat is allowed to be dissipated away from the heat elements. In one or more embodiments, the metal profile allows for a larger heat transfer surface area for distribution of heat generated by the heating element(s) towards the heat conducting material(s). In one or more embodiments, the metal profile is arranged between the heat element(s) and the heat-conducting material(s). The metal profile may be arranged to at least partially enclose the heating element(s). In one or more embodiments, the metal profile may be arranged to partially or entirely enclose both the heating element(s) and the first heat-conducting material(s). In one or more embodiments, the metal profile may be arranged in abutment with both the heat conducting material(s) and/or the heating element(s). In one or more embodiments, the metal profile may be made by an extrusion process. In one or more embodiments, the metal profile may preferably be made of aluminium, which has the advantage of being easy to shape and simultaneously allows for sufficient heat transfer.

In one or more embodiments, the heating arrangement includes a thermal switch mechanism for preventing overheating of the heating arrangement.

In one or more embodiments, the thermal switch mechanism is a device configured to interrupt or allow flow of electric current based on temperature. Advantageously, this allows for protection of the heating arrangement from overheating and causing damage to especially the gasket profile. Overheating may for example occur in cases where the glass door of the refrigerating unit is left open. In one or more embodiments, the thermal switch mechanism is configured to be reused a plurality of times and may be reset automatically.

In one or more embodiments, the thermal switch mechanism is arranged to prevent a flow of current to be supplied to the heating element(s), when the temperature of the heating element(s) reaches a temperature above 30 degrees Celsius, such as above 35 degrees Celsius, or preferably above 40 degrees Celsius. In one or more embodiments, the thermal switch mechanism is arranged to allow a flow of current to be supplied to the heating element(s), when the temperature of the heating element(s) are below 40 degrees Celsius, such as below 35 degrees Celsius, or such as below 30 degrees Celsius.

In one or more embodiments, the thermal switch mechanism may be an electromechanical device, which is configured to "open" and "close" contacts within the device so as to prevent or allow current from flowing through the contacts, respectively. The thermal switch mechanism may be arranged to control the flow of current based on a temperature reading from a temperature sensor arranged to measure the temperature of the first heat conducting material.

In one or more embodiments, the switching effect of the thermal switch mechanism may be realized through a bimetallic strip or cap of the thermal switch.

In one or more embodiments, the base profile is the lowermost side profile of the compartment extending substantially parallel to the ground floor on which the refrigerating unit is placed when in use. The base profile may be in connection with three or more further side profiles, so as to collectively extend around the entire circumference of the compartment opening. In one or more embodiments, the base profile is made of a polymer material such as Polyvinylchloride (PVC). In one or more embodiment, the base profile may be installed on an edge of a lowermost sidewall of the compartment and/or on an inner surface of a lowermost sidewall of the compartment.

In one or more embodiment, the elongated gasket is of longitudinal extent extending in parallel with the longitudinal extent of the base profile. The gasket profile may partially enclosed by the base profile, at the proximal part of the gasket and the gasket profile may extend along and at least partly inside said base profile. In one or more embodiments, the gasket profile furthermore extends along a first direction arranged perpendicular to the contact surface of the distal part, e.g., along the ground on which the refrigerating unit is placed when in use and perpendicular to the longitudinal extent of the base profile. In one or more embodiments, the gasket profile may be symmetrical about the first direction. In one or more embodiments, the distal part and the proximal part may be arranged side-by-side along the first direction.

In one or more embodiments, the flexible element of the proximal part may be configured to allow for a decrease in dimensional extent, particularly in transverse extent, by an applied compression and expansion force and the flexible element may further be configured to restore its original shape upon release of the applied compression force. In one or more embodiments, the flexible element includes an elastically deformable material.

In one or more embodiments, the proximal part includes one or more cavities enclosed by a wall of the proximal part, wherein the wall of the proximal part is configured to be elastically deformable so as to allow for an increase or decrease a transverse extent of the one or more cavities, and thereby allow for an increase or decrease a transverse extent of the proximal part, thereby providing the flexible element of the proximal part. In one or more embodiments, the flexible element of the proximal part allows for a decrease in the transverse extent of the one or more cavities, in particular along the first direction, so as to allow a displacement of the distal part along the first direction upon impact of the glass door.

In one or more embodiments, the hollow part provides a cavity enclosed by one or more sides of the hollow part, preferably enclosed by a contiguous side of the hollow part. In one or more embodiments, the heating element(s) and the contact surface may be separated by a part of the side(s) of the hollow part, which part may preferably be configured to allow a transfer of heat between the heating element(s) and the contact surface of the distal part.

In one or more embodiments, at least the side(s) of the hollow part of the gasket profile may be made of a material, which maintains structural integrity in a temperature range between −10 degrees Celsius and +80 degrees Celsius, such as between −20 and +150 degrees. In one or more embodiments, the side(s) of the hollow part may include an elastically deformable material.

In one or more embodiments, the distal part and/or the proximal part of the gasket profile is made of or include one or more of the following first group of materials: thermoplastic elastomers, for example based on olefin and/or based on urethane, cross-linked thermoplastic elastomer based on olefin, thermoplastic co-polyester, Styrene block copolymers (SBS, SEBS, SEPS, SEEPS and MBS) and/or thermoplastic copolyamides. Furthermore, the group of polymeric materials may further include materials containing chariot, preferably polypropylene, acrylonitrile-butadiene-styrene copolymer, polycarbonate, polyvinyl chloride, polymethyl methacrylate, polyethylene terephthalate and/or polyurethane. In one or more embodiments, the gasket profile may include a mixture of two or more of these materials.

Additionally, the gasket profile may also include one or more of the following second group of materials: Polyvinylchloride (PVC); Poly-olefin, such as Polypropylene (PP) or Polyethylene (PE); styrene-based Polymer, such as Polystyrol (PS) or Styrene-butadiene copolymer with a predominant styrene content (SB) or Acrylonitrile-styrene-acrylic ester copolymers (ASA) or acrylonitrile-butadiene-styrene copolymers (ABS) or styrene-acrylonitrile (SAN); Polybutylene terephthalate (PBT); Polyethylene terephthalate (PET); Polyoxymethylene (POM); Polyamide (PA); Polymethyl methacrylate (PMMA); Polyphenylene oxide (PPO); Polyether ether ketone (PEEK); Polyphenylene sulphide (PPS); Liquid crystal polymer (LCP); Polyamideimides (PAI); Polyvinylidene fluoride (PVDF); Polyphenyl sulfone (PPSU); Polyaryl ether ketone (PAEK); Polyacrylonitrile (PAN); Polychlorotrifluoroethylene (PCTFE); Polyether ketone (PEK); Polyimide (PI); Polyisobutene (PIB); Polyphthalamide (PPA); Polypyrrole PPY); polytetrafluoroethylene (PTFE); Polyurethane (PUR); Polyvinyl alcohol (PVA); Polyvinyl acetate (PVAC) and/or Polyvinylidene chloride (PVDC). E.g., the gasket profile may include a mixture of at least two of these materials.

In one or more embodiments, the materials of the second group are more rigid and hard than the materials of the first group.

In one or more embodiments, the gasket profile may include one or more polymeric materials selected from the first group, e.g. a thermoplastic elastomer or PVC and one or more polymeric materials selected from the second group, e.g. PVC or PE, or PP. The polymeric materials may be co-extruded, e.g. with a binder material. In one or more embodiments, the distal part of the gasket profile is of a material selected from the first group of polymeric materials and the proximal part is made of or comprises a polymeric material selected from the second group of polymeric materials. The proximal part may be made of a combination of material(s) of the first group and material(s) of the second group. In one or more embodiments, the distal part and the proximal part of the gasket profile may be contiguous.

In one or more embodiments, the distal part and the proximal part of the gasket profile may include or be made of an elastomer material, e.g., a cured elastomer composition, wherein the elastomer material includes one or more materials selected from the following third group: natural rubber, polyisoprene rubber, poly (styrene-co-butadiene) rubber (SBR), polybutadiene rubber (BR), poly (isoprene-cobutadiene)—rubber (IBR), styrene-isoprene-butadiene rubber (SIBR), ethylene-propylene rubber (EPR), ethylene-propylene-diene rubber (EPDM), polysulfide, isobutylene/cyclopentadiene copolymer rubber, isobutylene/methylcyclopentadiene copolymer-rubber, nitrile rubber, propylene oxide polymer, star-branched butyl rubber and halogenated, star-branched butyl rubber, brominated butyl rubber, chlorinated butyl rubber, star-branched polyisobutylene rubber, star-branched, brominated butyl (polyisobutylene/isoprene copolymer)-polyethylene rubber, poly-butylene rubber (Isobutylene-co-p-methylstyrene), halogenated poly (isobutylene-co-isoprene-co-p-methylstyrene), poly (isobutylene-co-isoprene-co-styrene), halogenated poly (isobutylene-co-isoprene-co-styrene), poly (isobutylene-co-isoprene-co-α-methylstyrene) and/or halogenated poly(isobutylene-co-isoprene)-co-α-methylstyrene).

In one or more embodiments, the elastomer material may further include a filler activated carbon, modified activated carbon, silicates, carbonates, clay, exfoliated clay and/or clay treated with organic molecules.

BRIEF DESCRIPTION OF THE DRAWINGS

Examples of the present disclosure will be described in the following with reference to the figures in which.

DETAILED DESCRIPTION OF THE INVENTION

Figure 1:
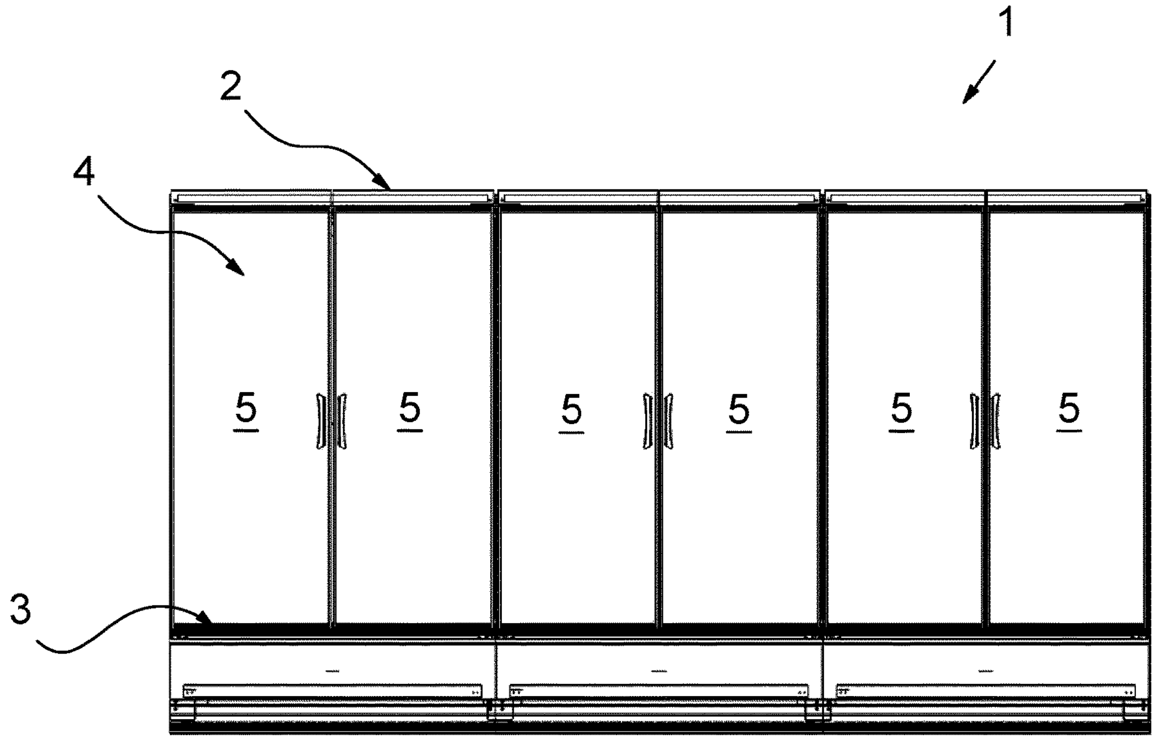
FIG. 1 shows a refrigerating unit according to embodiment(s) of the invention.

FIG. 1 illustrates a refrigerating unit 1 according to embodiments of the invention, seen from the front of the refrigerating unit 1. The refrigerating unit 1 may be suitable for use in a supermarket or the like, as a showcase and refrigerator for food stuff. The present refrigerating unit 1 includes a generally rectangular compartment 2 having a generally rectangular opening provided therein to allow access to the interior of the compartment 2, wherein the opening is defined by edges of one or more sidewalls of the compartment 2. A base profile 3 is connected to the compartment 2 at the bottom of the compartment 2, e.g., along an edge of a lowermost sidewall of the compartment 2, defining the lowermost boundary of the opening. In the present example, a plurality of glass doors 4 are pivotally connected to the compartment 2 and configured to be rotated about a substantially vertical axis between an open and closed configuration. The glass doors 4 of the present invention are operable through a handle attached to each glass door 4. The doors 4 are arranged so as to cover the opening of the compartment 2, while allowing the interior of the compartment 2 to be viewed through the glass pane(s) 5 of the glass door 4. In one or more examples, the refrigerating unit 1 may include a single compartment 2 and one or more glass doors 4 or the refrigerating unit 1 may include a plurality of compartments 2, and/or one or more glass doors 4.

FIG. 2-7 shows parts of a refrigerating unit 1 according to embodiments of the invention. The refrigerating unit 1 of the present examples is configured to be placed on a ground surface and having substantially vertically arranged glass doors 4, such as the refrigerating unit 1 shown in FIG. 1.

Figure 2:
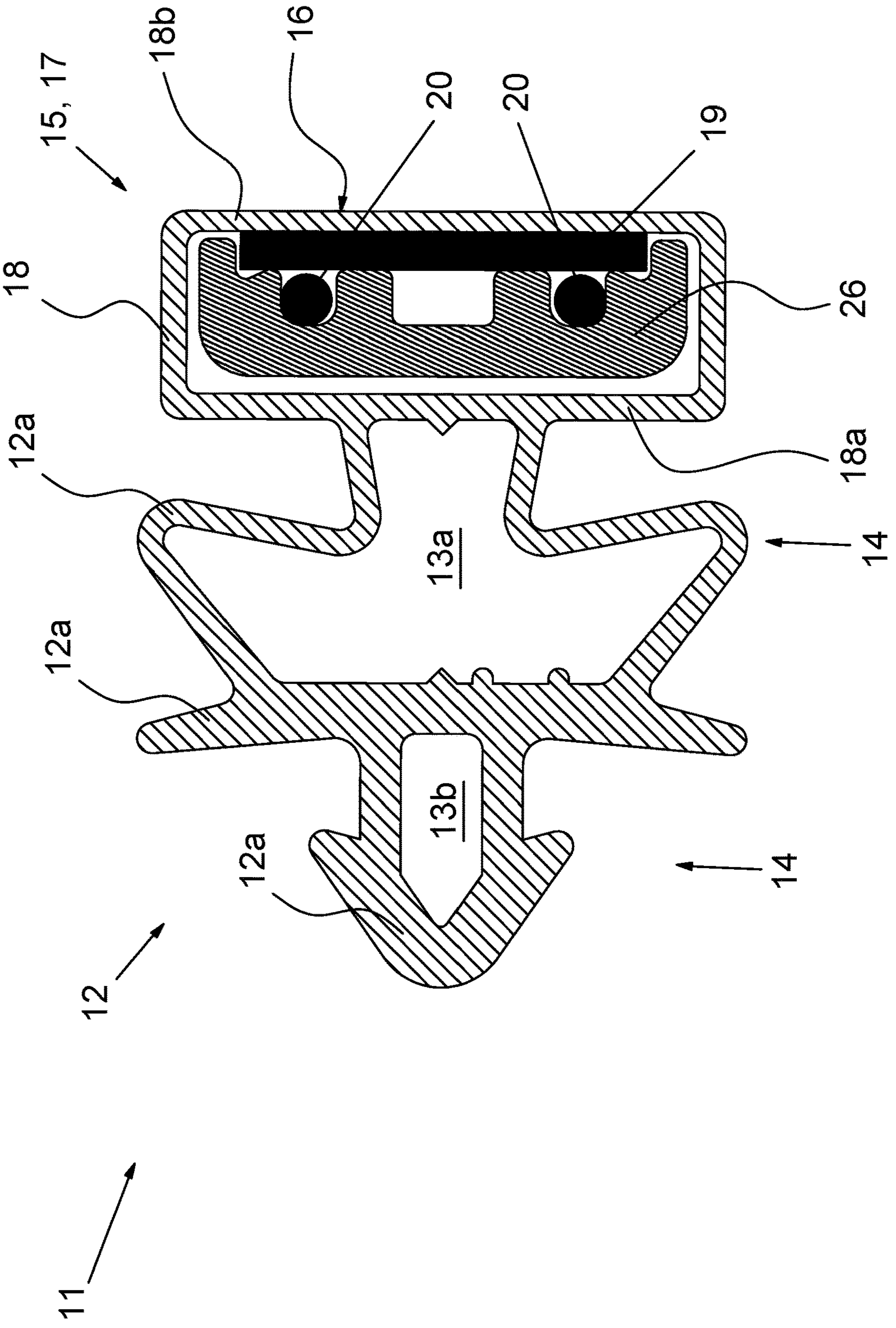
FIG. 2 shows a transverse cross-sectional view of the elongated gasket profile with heating elements, first heat-conducting material and metal profile according to embodiments of the invention.
Figure 3:
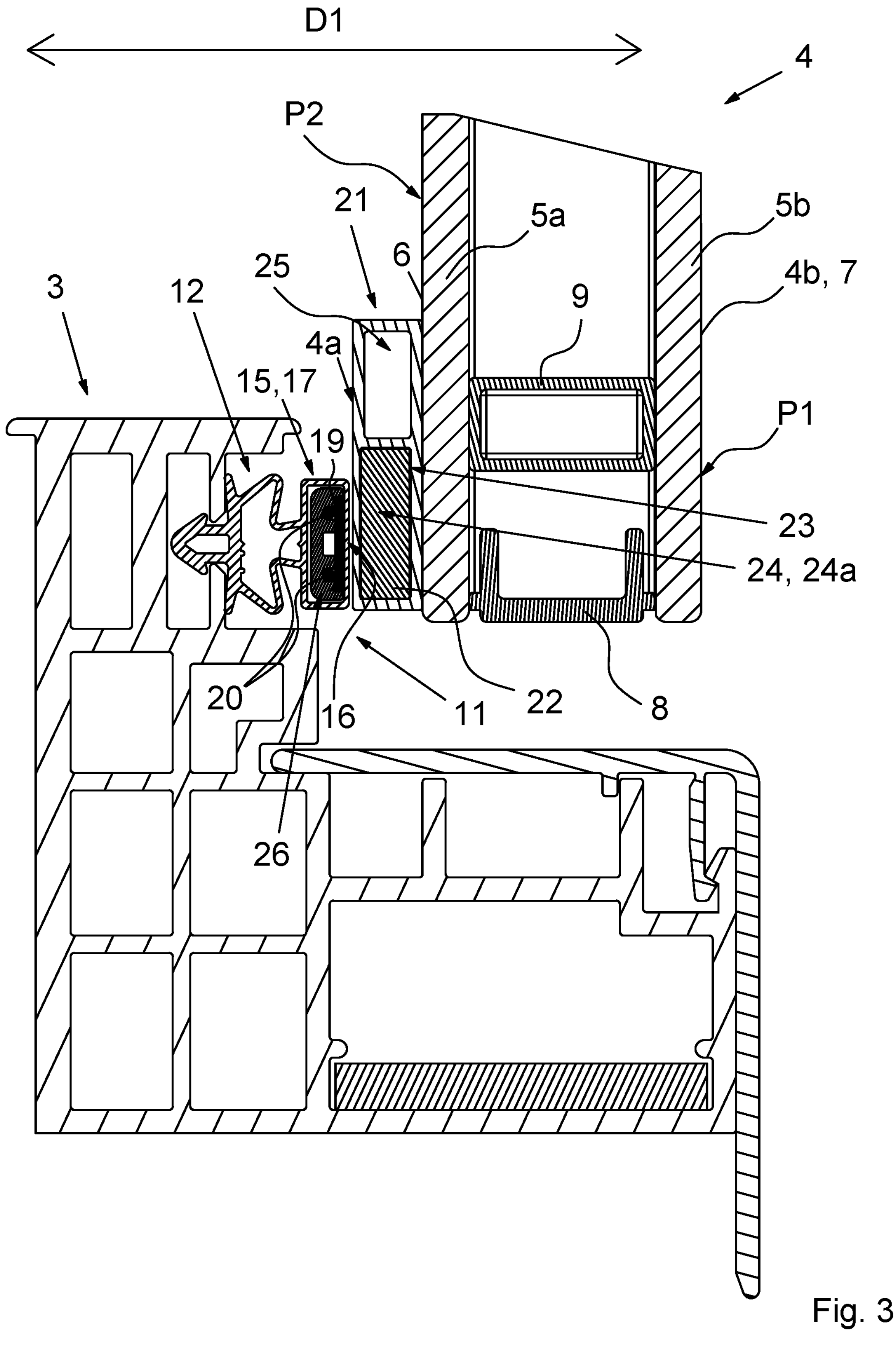
FIG. 3 shows a transverse cross-sectional view of the refrigerating unit near the base profile.
Figure 4:
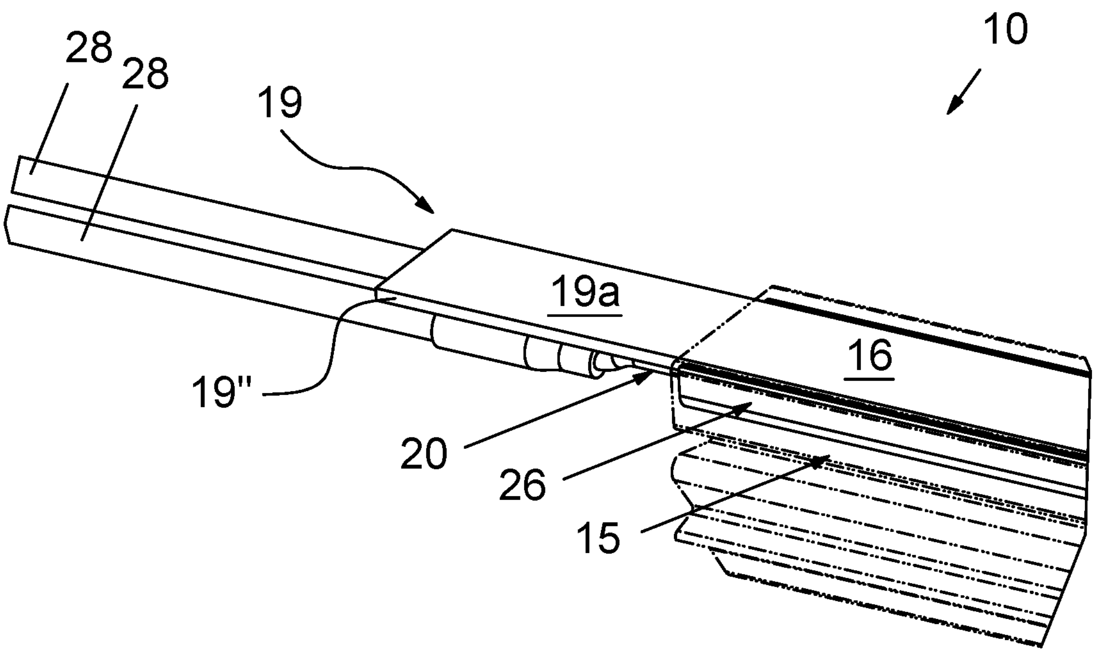
FIG. 4 shows a first end of the heating arrangement showing an elongated gasket profile with heating elements, first heat-conducting material and metal profile according to embodiment(s) of the invention, seen in perspective.
Figure 6:
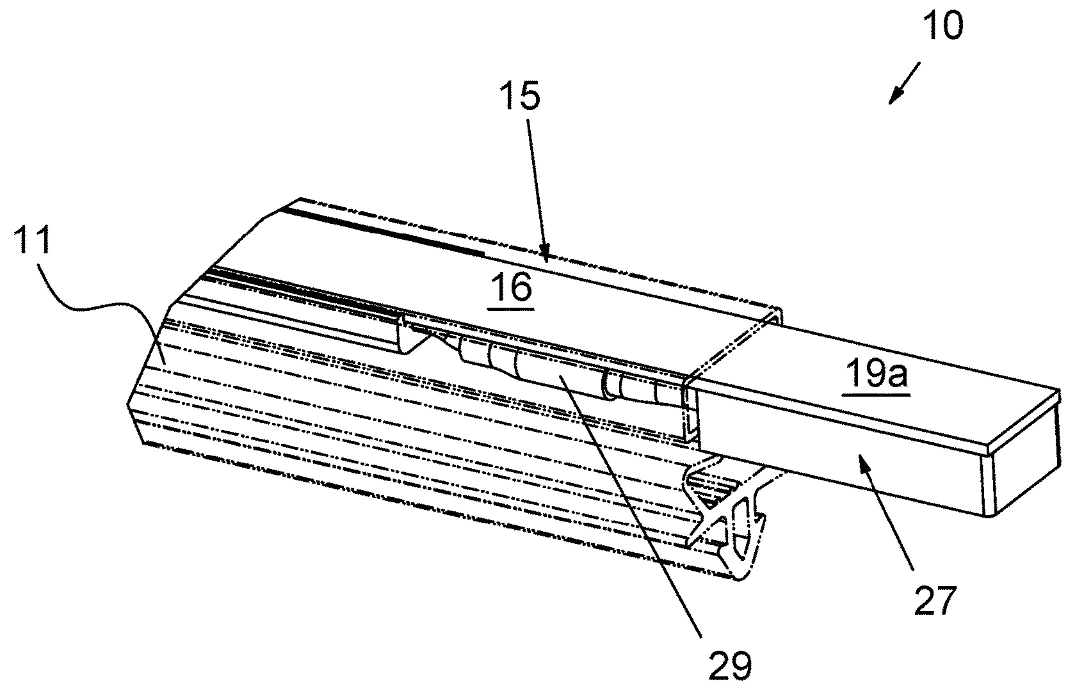
FIG. 6 shows a second end of the heating arrangement showing an elongated gasket profile with heating elements, first heat-conducting material and metal profile, as well as a thermal switch mechanism according to embodiment(s) of the invention, seen in perspective.

FIG. 2 shows a transverse cross-sectional view of an elongated gasket profile 11 according to an example of the invention, wherein the transverse cross sectional plane is arranged perpendicular to the longitudinal extent of the gasket profile 11. The present example of the gasket profile 11 is also shown in FIGS. 3, 4 and 6. The gasket profile 11 may preferably be installed with the longitudinal extent of the gasket profile 11 arranged along the bottom of the compartment 2, connected to the base profile 3. The longitudinal extent of the gasket profile 11 may extend along the bottom edge of the glass door 4 or the collective longitudinal extent of the bottom edges of more than one glass door 4 of the refrigerating unit 1.

The gasket profile 11 in FIG. 2 includes a distal part 15 having a contact surface 16 arranged to come into contact with a glass door 4 when the glass door 4 is closed. The distal part 15 further includes a hollow part 17 providing a cavity enclosed by sides of the hollow part 18. The cavity of the hollow part 17 is partly enclosed by a first side 18*a* and an opposing second side of the hollow part 18*b*, the first side 18*a* and second side 18*b* being opposing each other. An inner surface of the second side of the hollow part is directed towards the cavity and an outer surface of the second side includes the contact surface of the distal part 16. In the present example, a first heat conducting material 19, e.g., a ferromagnetic material 19 such as an elongated ferromagnetic strip, is arranged with an outer side surface of the first heat-conducing material 19 abutting the inner surface of the second side of the hollow part 18*b*, so as to provide a large area of contact for transfer of heat by conduction. Two elongated heating elements 20, e.g., heating wires or cords, are arranged along the elongated cavity of the hollow part 17 and in abutment with the first heat-conducting material 19, so that heat may be transferred to the second side of the hollow part 18*b* via the first heat-conducting material 19 by conductive heating. As seen in the present example, a metal profile 26, e.g., aluminium profile, may additionally be placed in the hollow part 17 so as to at least partly enclose the heating elements 20 and to provide additional pathway(s) for conductive transfer of the heat generated by the heating elements 20 to the first heat-conducting material 19. Furthermore, the metal profile 26 may aid in maintaining the positions of the heating elements 20 inside the hollow part 17. In the present example, the metal profile 26 has an open side providing one or more cavities arranged to receive the heating elements 20 and with one or more open side surfaces arranged to abut the first heat-conducting material 19.

The gasket profile 11 as shown in FIG. 2 also includes a proximal part 12 connected to the first side of the hollow part 18*a* at an outer surface of the first side of the hollow part. Alternatively, or additionally the proximal part 12 may be connected any position(s) on the distal part 15. The proximal part 12 includes a wall 12*a*, which in the present examples has a number of bends along the wall 12*a* and protrusions extending from the wall of the proximal part 12*a*. The wall of the proximal part 12*a* encloses a first cavity of the proximal part 13*a* and a second cavity of the proximal part 13*b*, which are arranged to accommodate a displacement of the wall of the proximal part 12*a* towards the cavities 13*a*, 13*b*, so as to decrease the transverse extent of the proximal part 12. The cavities 13*a*, 13*b* and the wall of the proximal part 12*a* thereby provide the flexible element(s) of the proximal part 14.

In the present examples, a part or the entire wall of the proximal part 12*a* may be made of an elastically deformable material, such as of material(s) selected form the first group, second group and/or third group of materials according to the invention, which allows the proximal part 12 to be biased by an applied compressive or pulling force. After a release of the force on the wall of the proximal part 12*a*, the wall 12*a* will try to restore its original equilibrium shape. E.g. this allows the proximal part 12 to be deformed and inserted into the base profile 3, by displacement of at least a part of the wall of the proximal part 12*a* so as to decrease the transverse extent of the second cavity 13*b*. Hereafter the proximal part 12 and thereby the gasket profile 11 may be retained by the base profile 3 in particular by one or more of the protrusions of the wall of the proximal part 12*a* inserted into the base profile 3. In one or more examples, at least the part of the wall of the proximal part 12 retained in the base profile 3 is made of material selected from the second group of materials, such as PVC, PE or PP. The gasket profile 11 may also be retained in the base profile 3 due to the restoring force exerted by the proximal part 12. The retainment of the gasket profile 11 is in particular seen in FIG. 3.

The deformable wall of the proximal part 12*a* also provides the effect of allowing the gasket profile 11 to be compressed or expanded in the first direction D1 arranged perpendicular to the contact surface of the distal part 16. In particular the first cavity 13*a*, being the largest in transverse extent of the two cavities of the proximal part 13*a*, 13*b* and arranged nearest to the distal part of the gasket profile 15, provides a space for the wall of the proximal part 12*a* to be displaced within. The wall of the proximal part 12*a* and at least the first cavity 13*a* provides the flexible element 14 of the proximal part 12 for allowing the distal part 15 to be displaced along the first direction D1. This displacement may in particular occur during closing of the glass door 4, where the weight of the glass door 4 and the speed of the closing action exerts an impact force on the gasket profile 11. In one or more examples, the shape of the first cavity 13*a* and/or the second cavity 13*b* and/or the wall of the proximal part 12*a* and/or the material of the wall of the proximal part 12*a* may be altered to provide different properties of flexibility of the flexible element of the proximal part 14.

FIG. 3 shows a transverse cross-sectional view of the refrigerating unit 1 at the base profile 3. The transverse plane extends perpendicular to the longitudinal extent of the base profile 3. The base profile of the compartment 3 is seen including an opening directed for receiving at least a part of the proximal part of the gasket profile 12 and retaining the proximal part 12 therein. In one or more examples, the base profile 3 may be made of PVC.

Figure 8:
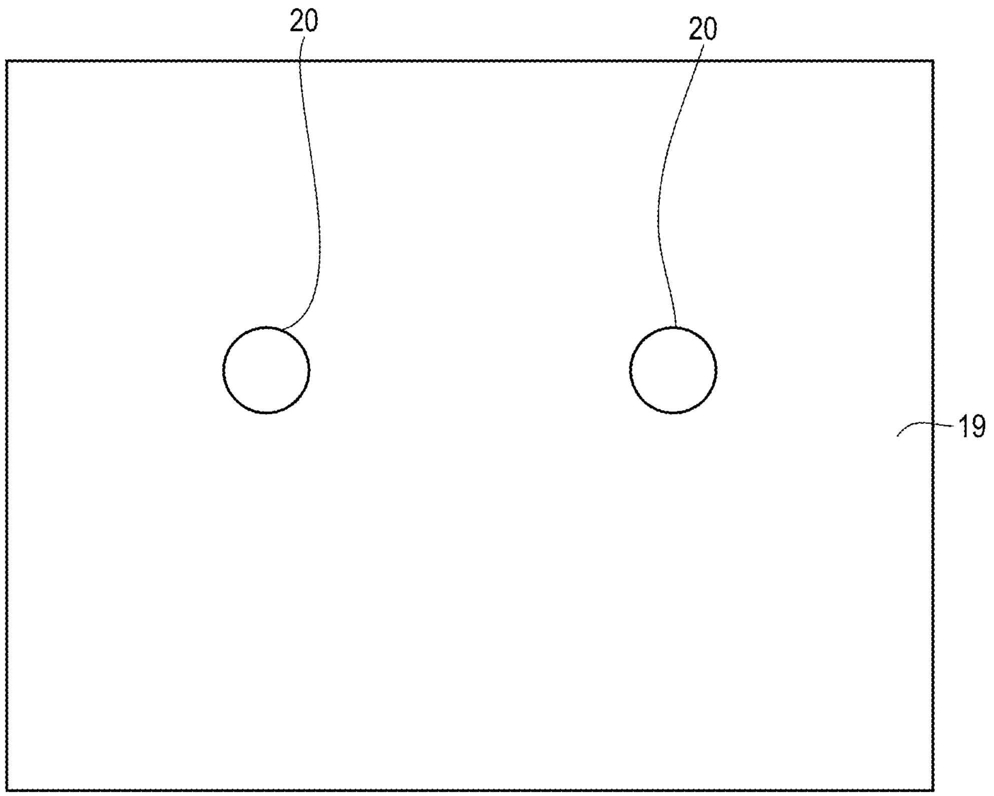

The gasket profile 11 of FIG. 3 is also shown in FIG. 2 and includes two elongated heating elements 20, e.g., wires, a first heat-conducting material 19 and a metal profile 26 arranged inside the hollow part 17 of the gasket profile 11. As seen in FIG. 3 the gasket profile 11 is configured to be arranged with the contact surface of the distal part 16 facing the outwards from the compartment 2, and such that the contact surface 16 comes into contact with the glass door 4, when the glass door 4 is closed. The first direction D1 is defined perpendicular to the contact surface of the distal part 16. The contact surface 16 may be generally planar extending along vertical and along the base profile 3. When viewed along the first direction D1 from left to right in FIG. 3, the base profile 3 is connected to the proximal part 12, the proximal part 12 is contiguous connected to the distal part 15, wherein the distal part 15 is seen enclosing a metal profile 26 partially arranged about the heating elements 20 and the first heat-conducting material 19. The metal profile 26, the heating elements 20 and the first heat-conducting material 19 is seen positioned in this order from left to right along the first direction D1. In one or more examples, the heating elements 20 may be partially or fully embedded in the metal profile 26 and/or the first heat-conducting material 19. For example, as schematically shown in FIG. 8, the heating elements 20 may be fully embedded in the first heat-conducting material 19. Note that FIG. 8 is being presented for illustrative purposes only and so the figure should not be construed as limiting the shape, size, position, number, and/or orientation of the items shown.

In FIGS. 2 and 3 the first heat conducting material 19 is arranged abutting an inner surface of the second side of the hollow part 18*b*. The distal part 15 includes the contact surface 16 to the right of the first heat conducting material 19, along the first direction D1, on the outer surface of the second side of the hollow part 18*b*. As seen in FIG. 3, a contact interface between the glass door 4 and the compartment 2 is provided by the contact surface of the distal part 16 and a part of an inner surface of the glass door 4*a*. In the present example, the glass door 4 is in a closed configuration, in which the surfaces 4*a*, 16 are abutting.

In one or more examples, the side(s) of the hollow part 18 is made of a material selected from the first group of materials according to the invention, such as polyvinylchloride (PVC) or thermoplastic elastomer (TPE). In one or more examples, the thickness of the second side of the hollow part 18*b* measured from the contact surface 16 to the inner surface of the second side of the hollow part 18*b* along the first direction D1 may preferably be of a thickness allowing a sufficient transfer of heat through the second side 18*b*, such as between 0.1 mm and 2 mm in thickness, preferably between 0.1 mm and 0.8 mm.

The cross-sectional view of FIG. 3 shows a lower part of the glass door 4, near a lowermost edge of the glass door 4. The glass door 4 is shown having two glass panes 5, an innermost glass pane 5*a* with an inner glass pane surface 6 arranged towards the compartment 2 and an outermost glass pane 5*b* having an outer glass pane surface 7 directed towards the outside of the refrigerating unit 1. In one or more examples, two spacer elements 8, 9 are arranged along the first direction D1 from the innermost glass pane 5*a* to the outermost glass pane 5*b*, wherein the first spacer element 8 is a reinforcement member 8, preferably made of a heat-conducting material such as metal, e.g. aluminium. The second spacing element 9 is preferably made of a polymeric material or a metal e.g. aluminium. In the present example, by having one or more spacer elements 8, 9 of a heat-conducting material, the heat transferred to the inner surface of the glass door 4*a* may be transferred through the spacer element(s) 8, 9 to the outer surface of the glass door 4*b*.

In one or more examples, and as seen in FIG. 3, the inner surface of the glass door 4*a* includes a contact profile 21 preferably made of PVC. The contact profile 21 is arranged to come into contact with the contact surface of the distal part 16 of the gasket profile 11. The contact profile 21 has first space of the contact profile 22, which is filled with a second heat-conducting material 24, which in the present example may be a permanent magnet 24*a*. The permanent magnet 24*a* may be co-extruded with the contact profile 21 and extending between boundaries of the first space 23 of the contact profile 21.

In one or more examples, the permanent magnet 24*a* is arranged to interact with a ferromagnetic material 19 being the first heat conducting material of the gasket profile 19. The interaction between the permanent magnet 24*a* and the ferromagnetic material 19 may be arranged to apply a pulling force on the gasket profile 11 and thereby on the proximal part 12 in a direction outwards from the base profile 3 along the first direction D1. This may in particular occur at the side of the glass door 4 attached to the compartment 2 by hinges. In one or more embodiments, the pulling force is also present in embodiments, where a permanent magnetic material 24*a* is arranged in the gasket profile 11 and a ferromagnetic material 19 is arranged as a part of the glass door 4.

The contact profile 21 of FIG. 3 further includes a second space being an insulating space 25 arranged above the first space 22 along the vertical direction along the inner glass pane surface 6 of the glass door 4. In the present example, the first space 22 is separated from the insulating space 25, but in an alternative example, they may not be separated and instead share a common first space 22 of the contact profile 21. In the present example, the insulating space 25 may be filled with air and provide insulation for the inner glass pane surface of the glass door 6 from the heat generated by the heating elements 20.

The present refrigerating door 1 according to examples of the inventions provides a temperature of the outer glass pane surface 7 of about 16-17 degrees Celsius at a first position P1 near the bottom of the glass door 4 and a temperature of the inner glass pane surface 6 of about 3-5 degrees Celsius at a second position P2 near the bottom edge of the glass door 4, when the heating arrangement 10 is deactivated. Upon activating the heating arrangement 10, a heating power of about 10 W/m is provided, such that the first heat conducting material 19 reaches a temperature of about 27 degrees Celsius, the outer glass pane surface 7 reaches a temperature of about 21-23 degrees Celsius at the first position P1 near the bottom of the glass door 4, while the inner glass pane surface 6 reaches a temperature of about 4-6 degrees Celsius at the second position P2 near the bottom edge of the glass door 4.

Figure 5:
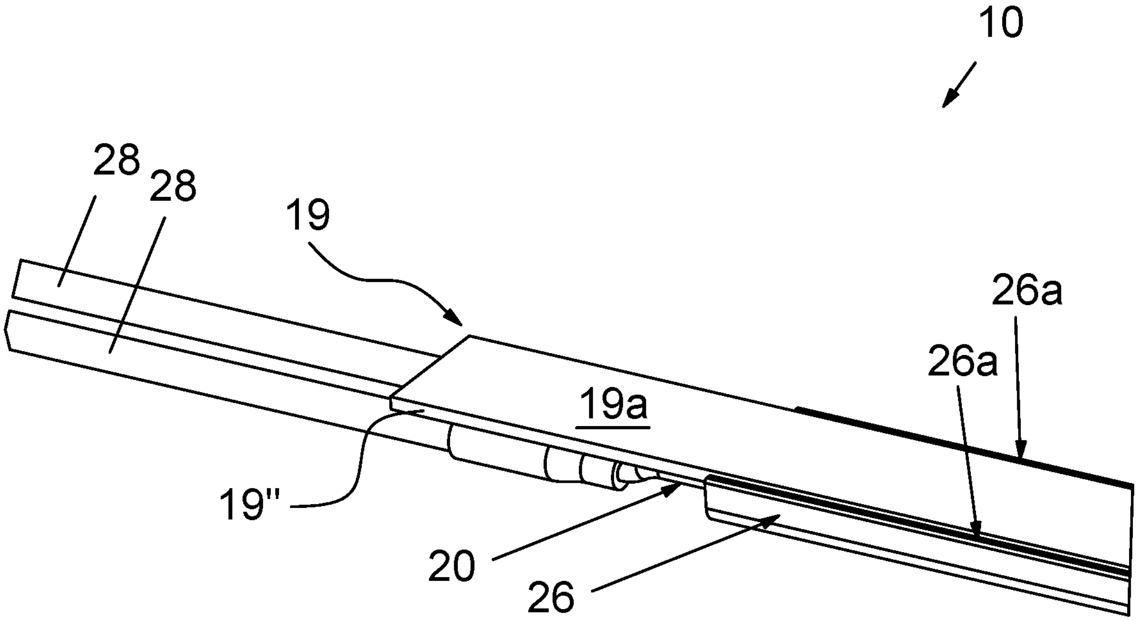
FIG. 5 shows eating elements, first heat-conducting material and metal profile of FIG. 4, seen in perspective.
Figure 7:
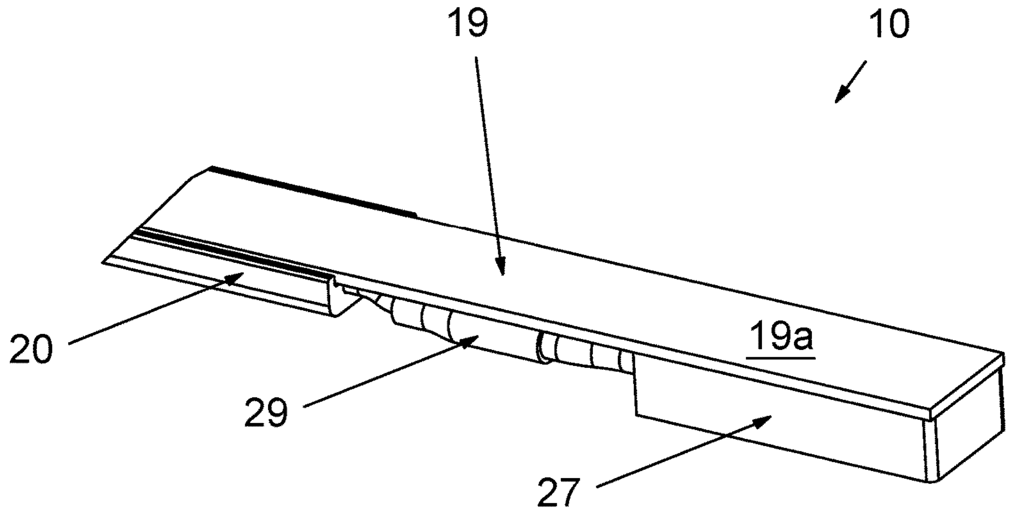
FIG. 7 shows heating elements, first heat-conducting material, metal profile and thermal switch mechanism of FIG. 6, seen in perspective, and FIG. 8 schematically shows an embodiment of heating elements embedded within a heat-conducting material.

FIGS. 4 and 5 shows a first end of the heating arrangement 10 configured to extend along the base profile 3 of the refrigerating unit 1. FIGS. 6 and 7 shows a second end of the heating arrangement 10 opposite the first end of the heating arrangement 10.

In FIG. 4, a first heat-conducting element 19 provided as a strip, a metal profile 26 and heat elements 20 are seen in an exemplary configuration. Furthermore, a gasket profile 11 according to examples of the invention is indicated by dashed lines, showing a first end of the elongated gasket profile 11 with the distal part 15 of the gasket profile 11 enclosing the strip of the first heat-conducting material 19, the metal profile 26 and the heat elements 20. In the present example, the first heat conduction material 19 protrudes a distance beyond the end of the gasket profile 11 and extends along the heating elements 20 and connections between the heating elements 20 and one or more power supply cables 28 connected to means for supplying power to the heating elements 20.

In one or more examples, and as seen in FIGS. 4 and 5, the metal profile 26 may extend along longitudinal edges 19" of the strip of the first heat-conducting material 19 and so that ends of the metal profile 26*a* is substantially extending perpendicular to the longitudinal edges of the strip 19". This is in particular visible in FIG. 5. In one or more examples, ends of the metal profile 26*a* may be substantially flush with the outer side surface of the strip of first heat-conducting material 19*a* arranged to come into contact with the second side of the hollow part 18*b*, which includes the contact surface of the distal part 16, so that the metal profile 26 is also arranged to come into contact with the second side of the hollow profile 18*b*.

In FIG. 6 a second end of the elongated gasket profile 11 is indicated by dashed lines, with the distal part of the gasket profile 15 including a contact surface of the distal part 16, wherein the distal part 15 is enclosing a strip of the first heat-conducting element 19, a metal profile 26, heat elements 20 and connection elements 29 for connecting the heat elements 20 to a thermal switch mechanism 27 positioned adjacent to the second end of the elongated gasket 11. In one or more examples, the first heat conduction material 19 protrudes a distance beyond the end of the gasket profile 11 and extends along the thermal switch mechanism 27. Alternatively, the thermal switch mechanism 27 may be arranged at the first end of the gasket profile 11. FIG. 7 shows the example of FIG. 6 without indications of the gasket profile 11, and showing the strip of the first heat-conducting element 19, the metal profile 26, the heat elements 20, and the thermal switch mechanism 27 including-connection elements 29 for connecting to the thermal switch mechanism 27 to the heat elements 20.

In one or more examples, beyond the ends of the gasket profile 11, the heating arrangement 10 may be protected from the outside of the compartment 2 by one or more corner pieces.

REFERENCE LIST

1 Refrigerating unit
2 Compartment
3 Base profile of compartment
4 Glass door
4*a* Inner surface of the glass door
4*b* Outer surface of the glass door
5 Glass pane(s) of the glass door
5*a* Innermost glass pane
5*b* Outermost glass pane
6 Inner glass pane surface of the glass door
7 Outer glass pane surface of the glass door
8 First spacing element e.g. Reinforcement member
9 Second spacing element
10 Heating arrangement
11 Elongated gasket profile
12 Proximal part of elongated gasket profile
12*a* Wall(s) of the proximal part
13*a* First cavity
13*b* Second cavity
14 Flexible element of the proximal part
15 Distal part of elongated gasket profile
16 Contact surface of the distal part
17 Hollow part of the distal part
18 Sides of the hollow part
18*a* First side of the hollow part
18*b* Second side of the hollow part
19 First heat-conducting material, e.g. ferromagnetic material
19*a* Outer side surface of first heat-conducting material
19*b* Inner side surface of first heat-conducting material
19" Edge of first heat-conducting material
20 Heating elements, e.g. heating wires
21 Contact profile
22 First space of contact profile
23 Boundaries of the first space
24 Second heat-conducting material
24*a* Permanent magnetic material
25 Insulating space of contact profile

26 Metal profile, e.g. aluminium profile
26*a* End of metal profile
27 Thermal switch mechanism
28 Power supply cable(s)
29 Connection element(s)
D1 First direction
P1 First position
P2 Second position

The invention claimed is:

1. A refrigerating unit comprising:

a glass door;

a heating arrangement for modulating the temperature of an outer surface of the glass door of the refrigerating unit;

a compartment provided with an opening enclosed by side profiles, wherein the glass door allows access through the opening, wherein the heating arrangement is configured to be installed in a base profile of the compartment, and comprises;

an elongated gasket profile comprising a proximal part and a distal part, wherein the proximal part is arranged from the base profile to the distal part of the elongated gasket profile, and wherein the proximal part comprises at least one flexible element configured to allow the distal part to be displaced towards the base profile upon closing the glass door, wherein the distal part comprises at least one hollow part with a first side of the hollow part connected to the proximal part and an opposite second side of the hollow part comprising a contact surface directed towards the glass door;

one or more first heat-conducting materials enclosed by the hollow part and arranged with an outer side surface of the one or more first heat conducting materials abutting the second side of the hollow part; and one or more heating elements enclosed by the at least one hollow part and arranged for conductive heating of the one or more first heat-conducting materials, wherein the second side of the at least one hollow part extends across the one or more heating elements so as to separate the one or more heating elements from the contact surface.

2. The refrigerating unit according to claim 1, wherein the glass door comprises an inner surface of the glass door configured to come into contact with the distal part of the refrigerating unit, when the glass door is closed, and wherein the inner surface of the glass door comprises a contact profile comprising a second heat-conducting material.

3. The refrigerating unit according to claim 2, wherein the contact profile encloses an insulating space for decreasing a conductive transfer of heat between an inner glass pane surface of the glass door and the one or more heating elements, wherein the insulating space is arranged above the second heat-conducting material.

4. The refrigerating unit according to claim 2, wherein the second heat-conducting material comprises a permanent magnetic material.

5. The refrigerating unit according to claim 1, wherein the refrigerating unit comprises at least one permanent magnetic material connected to the glass door and wherein the refrigerating unit further comprises at least one ferromagnetic material enclosed by the at least one hollow part, wherein the at least one ferromagnetic material and the at least one permanent magnetic material are arranged in an opposing configuration such that a magnetic interaction between the at least one ferromagnetic material and the at least one permanent magnet aids in closing the glass door.

6. The refrigerating unit according to claim 5, further comprising a second heat-conducting material that comprises the at least one permanent magnetic material.

7. The refrigerating unit according to claim 1, wherein the one or more heating elements is at least partially embedded into the one or more first heat-conducting materials.

8. The refrigerating unit according to claim 1, wherein the refrigerating unit comprises a metal profile enclosed by the at least one hollow part of the distal part and arranged in abutment with the one or more first heat-conducting materials and the one or more heating elements.

9. The refrigerating unit according to claim 1, wherein the heating arrangement comprises a thermal switch mechanism for preventing overheating of the heating arrangement.

10. The refrigerating unit according to claim 1, wherein the at least one hollow part provides a cavity for accommodating the one or more heating elements and the one or more first heat-conducting materials, wherein the cavity is fully enclosed by contiguous sides of the at least one hollow part in a transverse cross-section of the elongated gasket profile.

11. The refrigerating unit according to claim 1, wherein a collective transverse extent of the one or more first heat-conducting materials facing the second side of the at least one hollow part is of a size being substantially equal to a size of a transverse extent of an inner surface of the second side of the at least one hollow part, wherein the transverse extent of the inner surface of the second side of the at least one hollow part is measured in a plane perpendicular to a longitudinal extent of the inner surface of the second side of the at least one hollow part.

12. The refrigerating unit according to claim 1, wherein the at least one hollow part comprises at least one permanent magnetic material and wherein the glass door comprises at least one ferromagnetic material, where the at least one ferromagnetic material and the at least one permanent magnetic material are arranged in an opposing configuration, such that a magnetic interaction between the at least one ferromagnetic material and the at least one permanent material aids in closing the glass door.

13. The refrigerating unit according to claim 12, wherein the one or more first heat-conducting materials comprises the at least one said ferromagnetic material.

14. The refrigerating unit according to claim 12, wherein the at least one permanent magnetic material is a polymer-bonded magnetic material.

* * * * *